(No Model.)

J. H. CONNELLY.
Preserved Wood.

No. 243,062.  Patented June 21, 1881.

Witnesses.
Jno K Smith
L. C. Fitler

Inventor.
Joseph H. Connelly
by his attys
Bakewell & Kerr

UNITED STATES PATENT OFFICE.

JOSEPH H. CONNELLY, OF ALLEGHENY, PENNSYLVANIA.

PRESERVED WOOD.

SPECIFICATION forming part of Letters Patent No. 243,062, dated June 21, 1881.

Application filed December 17, 1880. (No model.)

*To all whom it may concern:*

Be it known that I, JOSEPH H. CONNELLY, of the city of Allegheny, in the county of Allegheny and State of Pennsylvania, have invented a new and useful Improvement in Preserving Wood; and I do hereby declare the following to be a full, clear, and exact description thereof, reference being had to the accompanying drawings, forming part of this specification, in which—

Figure 1:
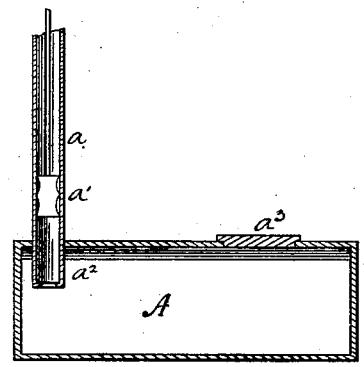
Figure 2:
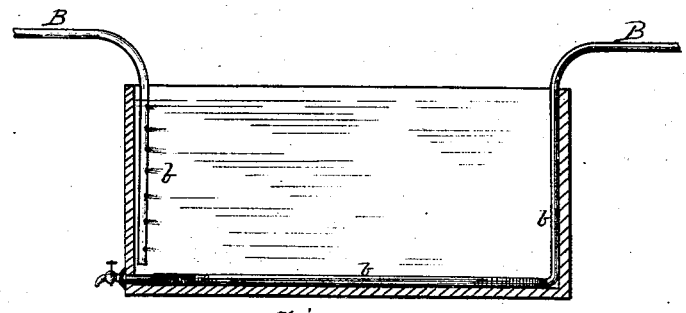

Figure 1 is a sectional view of a tank and apparatus used in treating wood with a solution of sulphate of ammonia under pressure. Fig. 2 is a sectional view of a tank for the same purpose provided with steam-heating pipes.

The object of my invention is to render wood uninflammable and to preserve it from decay; and it consists in treating it with a solution or preparation consisting, essentially, of sulphate of ammonia.

I will now describe my invention, so that others skilled in the art may manufacture and use the same.

I propose to render wood uninflammable by treating it or saturating it with a solution consisting, mainly, of sulphate of ammonia, or with a pure solution of the same, as shall be most preferable. The effect of this is to fill the pores of the wood with sulphate of ammonia, which, while it renders the wood entirely uninflammable, also renders it much more dense, durable, and capable of receiving a very high polish. The wood should be immersed in a tank containing a solution of sulphate of ammonia of about 29° Baumé, and allowed to remain there until it is completely saturated. With small pieces of wood the saturation occurs within a very short period of time, depending upon the density of the material; but where the pieces of wood are large and dense the absorption takes place more slowly, and to hasten it the solution and wood should be placed in an air-tight tank, A, Fig. 1, from which a pipe, $a$, extends upward. This pipe should be a little more than one inch in diameter and more than twenty-eight inches in length.

Inside of the pipe $a$ is a movable float, $a'$, which moves easily up and down in the pipe $a$, but is kept from falling into the tank A by the ring $a^2$. The solution and wood being placed in the tank A, the opening $a^3$, leading into the tank A, is tightly closed. Mercury is then poured into the pipe $a$, which forces down the float $a'$, and thereby produces a pressure in the tank A, and the wood is caused to absorb the solution of sulphate of ammonia much more rapidly. Care should be taken to have the float $a'$ tight enough in the pipe $a$ to prevent the mercury from flowing into the tank A. The pipe $a$ may be long enough and sufficient mercury or other fluid may be used to make a greater pressure, or any other suitable means may be employed to accomplish the same purpose.

The solution of pure sulphate of ammonia in water, although adapted to my purpose, is more expensive than another form of the same which may be used with equally satisfactory results. This solution is obtained from the gas-liquor from gas-works, or from vapors arising from coke-ovens, and forms the subject of another application.

Sometimes, where the pieces of wood which are to be treated with a solution of sulphate of ammonia are large and bulky, the solution should be heated, preferably by applying steam, either by jets or in coils, to the bath—as, for instance, at $b$ and $b'$, Fig. 2, B being the steam-pipe. It may also be used in a vacuum with improved results, or under pressure, as has already been described. In treating light and open wood the bath need not be heated, and may be open.

The operation is as follows: The material to be treated should be in a dry condition, and then immersed in the liquid in the tank A a sufficient length of time to saturate it. It is then permitted to dry gradually by exposure to the atmosphere, or it may be dried artificially; but in that case care must be taken not to dry it so rapidly as to drive out the sulphate, as then the wood would be imperfectly cured.

The advantages of my invention are, that the wood may be rendered perfectly uninflammable, and when properly dried is hard, capable of taking a high polish and a smooth finish, and is rendered very durable, as the salts fill up the pores, making it very dense, so much so that pine, hemlock, poplar, and other light woods, after they have been saturated, become suitable for railroad-ties, which heretofore have been made principally of oak, being then tough and dense enough to hold the spikes firmly, and not liable to be destroyed by worms or decay, as has been the case with light wood heretofore.

Having thus described my invention, what I claim, and desire to secure by Letters Patent, is—

As a new article, preserved wood impregnated with sulphate of ammonia, substantially as and for the purposes described.

In testimony whereof I have hereunto set my hand.

JOSEPH H. CONNELLY.

Witnesses:
T. B. KERR,
JNO. K. SMITH.